(12) United States Patent
Buchner

(10) Patent No.: US 6,380,642 B1
(45) Date of Patent: Apr. 30, 2002

(54) METHOD FOR STARTING A MOTOR VEHICLE AND IGNITION-STARTER DEVICE

(75) Inventor: Reiner Buchner, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,610

(22) Filed: Feb. 25, 2000

(30) Foreign Application Priority Data

Feb. 25, 1999 (DE) .......................................... 199 08 216

(51) Int. Cl.$^7$ .............................................. E05B 17/00
(52) U.S. Cl. ...................... 307/10.3; 307/9.1; 307/10.6; 70/252; 70/249
(58) Field of Search ................................ 307/9.1, 10.1, 307/10.2, 10.3, 10.4, 10.6; 70/237, 4, 5, 6, 248

(56) References Cited

U.S. PATENT DOCUMENTS 5,965,955 A  * 10/1999 Takanohashi .............. 307/10.5
5,982,292 A  * 11/1999 Tagawa et al. ........ 340/825.31

FOREIGN PATENT DOCUMENTS

| DE | 197 04 062 A1 | 8/1998 |
| DE | 197 11 901 C1 | 8/1998 |
| DE | 197 41 438 C1 | 12/1998 |
| EP | 0 720 545 B1 | 7/1996 |

* cited by examiner

Primary Examiner—Josie Ballato
Assistant Examiner—Robert L. DeBeradinis

(57) ABSTRACT

During manual activation of an activation switch, authorization data are transmitted from a key to a lock. A steering lock unlocks the steering if the authorization data correspond to reference data. The ignition is then switched on and the steering lock is deenergzied as long as the ignition remains switched on. Consequently, the steering lock cannot be activated inadvertently during operation.

8 Claims, 6 Drawing Sheets

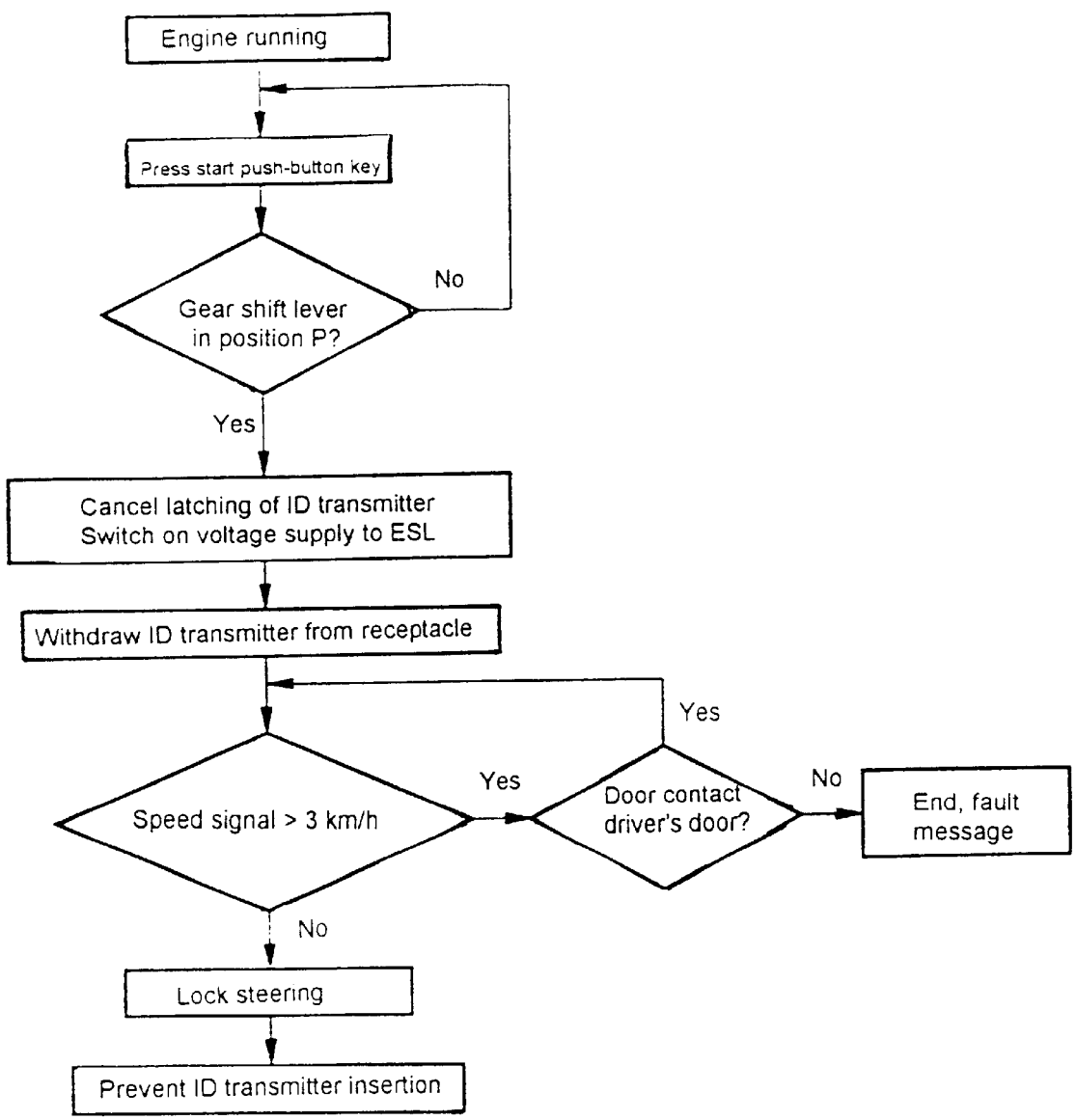
FIG 4  Automatic stop procedure

METHOD FOR STARTING A MOTOR VEHICLE AND IGNITION-STARTER DEVICE

BACKGROUND OF THE INVENTION

Field of the Invention

The invention, in general, relates to a method for starting a motor vehicle and to an ignition-starter device that is operated with such a method.

A known ignition-starter lock system (EP 0 720 545 B1) has an electronic ignition key and an associated electronic ignition-starter lock. The ignition key transmits an encoded authorization signal to the lock where the authorization signal is checked for its authorization. In the case of authorization, a blocking element is electromagnetically released so that the ignition key can be inserted into the lock or turned in it so that further switching procedures (such as releasing the immobilizer) can be activated.

In such an ignition-starter lock system there may also be a steering lock which permits the vehicle to be steered when there is authorization. Such steering locks are activated or deactivated when the ignition key is turned in the ignition lock.

However, if a key is used that does not have a beard that can be turned in the lock, for example, if a chip card is used as the key, safety is compromised because the steering lock is no longer activated and deactivated mechanically by the turned key. The steering lock can therefore be inadvertently activated while the ignition is switched on.

SUMMARY OF THE INVENTION

It is accordingly an object of the invention to provide a method for starting a motor vehicle and an ignition-starter device which overcomes the above-mentioned disadvantageous of prior art methods and devices of this general type, and which functions reliably even while the motor vehicle is operating.

With the foregoing and other objects in view there is provided, in accordance with the invention, a method of starting a motor vehicle that includes providing a motor vehicle with an engine, an ignition-starter lock, a steering assembly, and an imobilizer, and providing a key. A switch is manually activated to transmit, in a contactless manner, encoded authorization data between the key and the ignition-starter lock. If the transmitted authorization data corresponds to reference data, the steering lock is activated to electromechanically enable the steering assembly. If the transmitted authorization data corresponds to reference data, the mobilizer is released. The steering lock is de-energized as long as the engine remains switched on so that the steering lock cannot lock the steering inadvertently.

With the foregoing and other objects in view there is also provided, in accordance with the invention, an ignition-starter device for use with a steering column, an ignition, and an engine of an automobile and with an electronic key. The ignition-starter device includes an activation switch for cooperating with an electronic key. The activation switch provides a signal when manually actuated by the electronic key. The signal causes the electronic key to transmit encoded authorization data in a contactless manner. A receiver receives the encoded authorization data from the electronic key. A storage device is provided for storing reference data. A steering lock is provided for electromechanically locking and unlocking a steering column of an automobile. The steering lock unlocks the steering column if the authorization data received by the receiver corresponds with the reference data stored in the storage device. An imobilizer is provided for imobilizing an engine of an automobile. The mobilizer is released so that the engine can be started if the authorization data received by the receiver corresponds with the reference data stored in the storage device. A current switch is provided for supplying power to the steering lock. The current switch disconnects power from the steering lock as long as an ignition of the automobile is switched on resulting in enablement of the steering column of the automobile.

Advantageous refinements of the invention are described in the subclaims.

Other features which are considered as characteristic for the invention are set forth in the appended claims.

Although the invention is illustrated and described herein as embodied in a method for starting a motor vehicle and ignition-starter device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 shows a method for stopping the internal combustion engine.

DESCRIPTION OF THE PREFERRED EMBODIMENT

Figure 1:
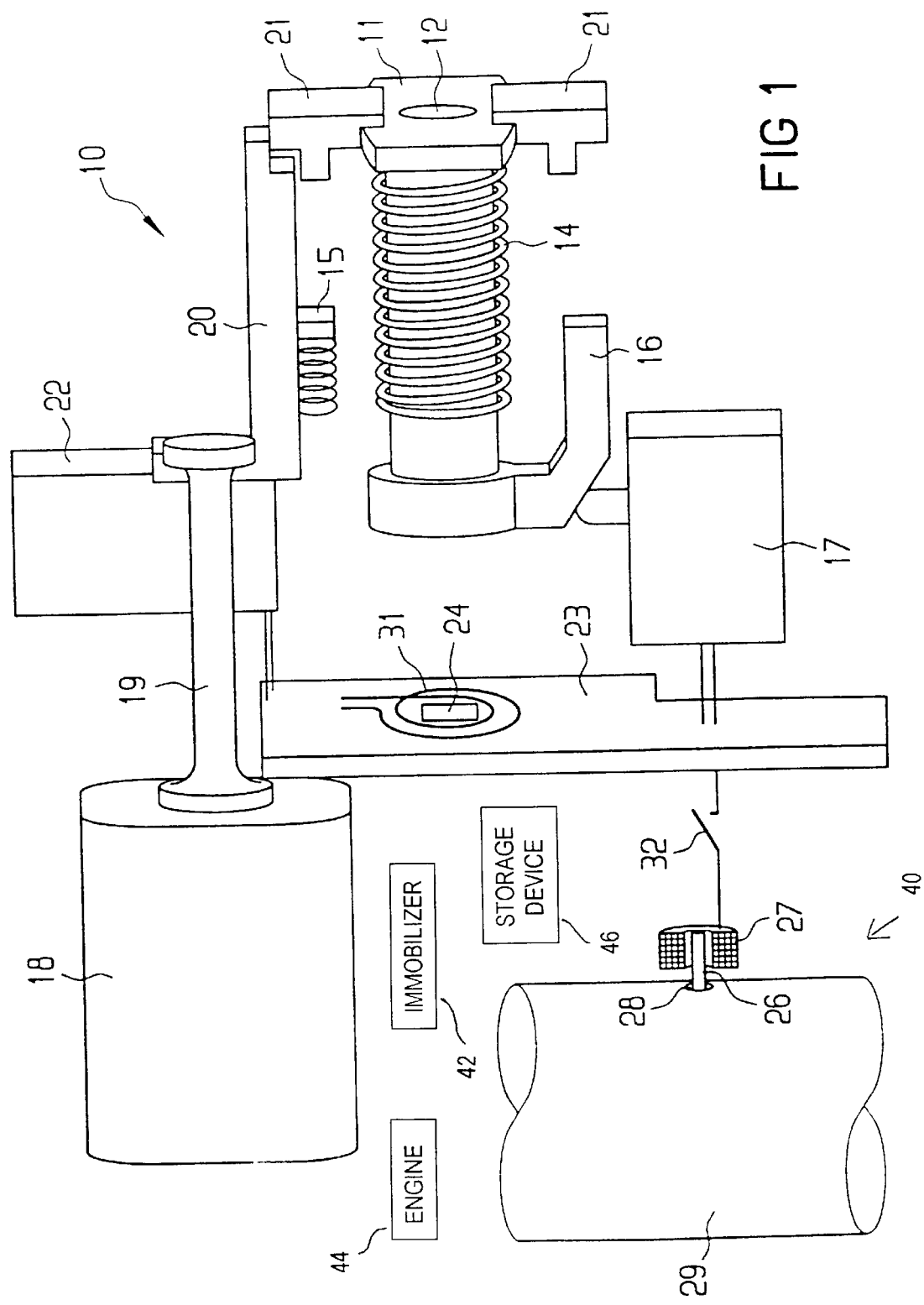
FIG. 1 shows a schematic design of an ignition-starter device.

Referring now to the figures of the drawing in detail and first, particularly to FIG. 1, there is shown an ignition starter device or lock 10.

At the key end, the ignition starter lock has a key receptacle 11 with a keyhole 12 into which a beard of an electronic key 13 (see FIG. 2) can be inserted. The key receptacle 11 is prestressed in the forward direction toward a keyhole 12 by a mechanical spring 14 and bears against a stop 15.

When the key 13 is inserted, the key receptacle 11 is pressed toward the rear, counter to the spring force. In the process, a pin 16 of the key receptacle 11 activates a first position sensor 17. The switching signal which is triggered as a result of the activation of the first position sensor 17 is used to detect whether the key 13 is inserted.

The ignition-starter device 10 has, at the lock end, a solenoid 18 whose axially moveable armature 19 moves a driver 20 to and fro. If the driver 20 is not attracted by the solenoid 18, insertion of the key 13 is impeded by a key latch 21. If the solenoid 18 attracts its armature 19, insertion of the key 13 is enabled.

If the key 13 is inserted and the driver 20 is not attracted, withdrawal of the key 13 (withdrawal lock) is impeded by the key latch 21. As a result, the key 12 cannot be withdrawn when the engine 44 is running. A second position sensor 22 detects whether the solenoid 18 is activated and whether the key latch 21 is thus released.

The states of the position sensors 17, 22 are supplied to a control circuit on a printed circuit board 23 where these states are evaluated in the control circuit. A receiver 24 is also configured on the printed circuit board 23. The receiver 24 receives an encoded signal (code signal) from the key 13 which is inserted in the key receptacle 11 and evaluates the encoded signal.

The key 13 preferably has an optical transmitter (IR transmitter) which is not illustrated. The IR code signal emitted by the key 13 is transmitted to the receiver 24 via a waveguide (not shown) in the key receptacle 11.

Figure 2:
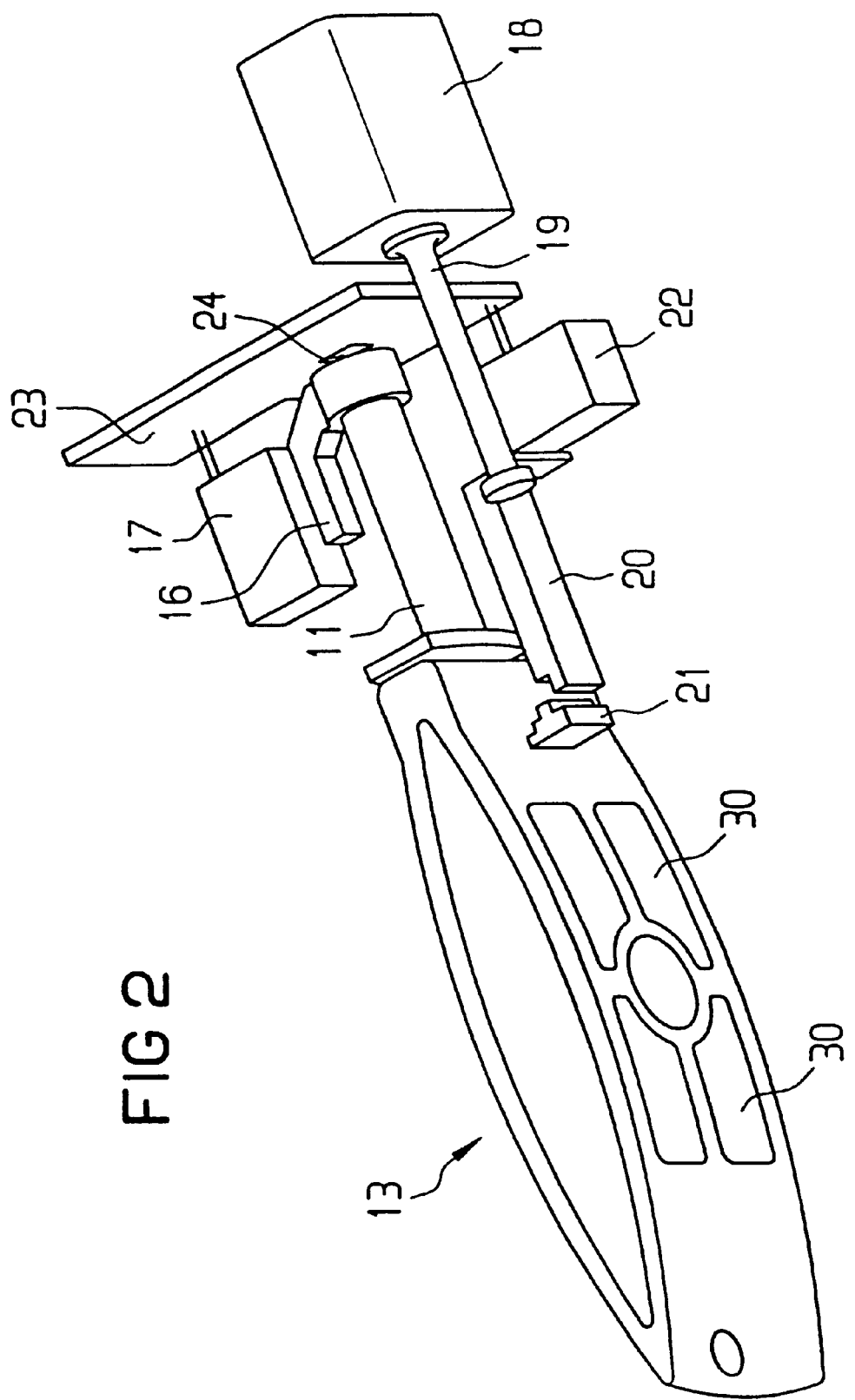
FIG. 2 shows a schematic design of the ignition-starter device according to FIG. 1 with an inserted key.

One of the ends of the waveguide is advantageously located, as illustrated in FIG. 2, in the direct vicinity of the receiver 24 when the key 13 is inserted. The key 13 has therefore been inserted into the lock 10 counter to the spring force of the spring 14 and remains in this position, held by the key latch 21.

If the coded signal is recognized as being authorized, a steering lock 40 can be released by the control circuit on the printed circuit board 23, and an immobilizer 42 can be released.

The steering lock 40 has a bolt 26 which engages in a recess 28 in the steering column 29 under the control of an electromagnet 27. As a result, the steering column 29 is locked.

The function of the immobilizer 42 can be contained in an engine control unit (not illustrated). The function of the engine control unit can be enabled and the motor vehicle then used satisfactorily only when there is an authorized code signal.

Figure 3A:
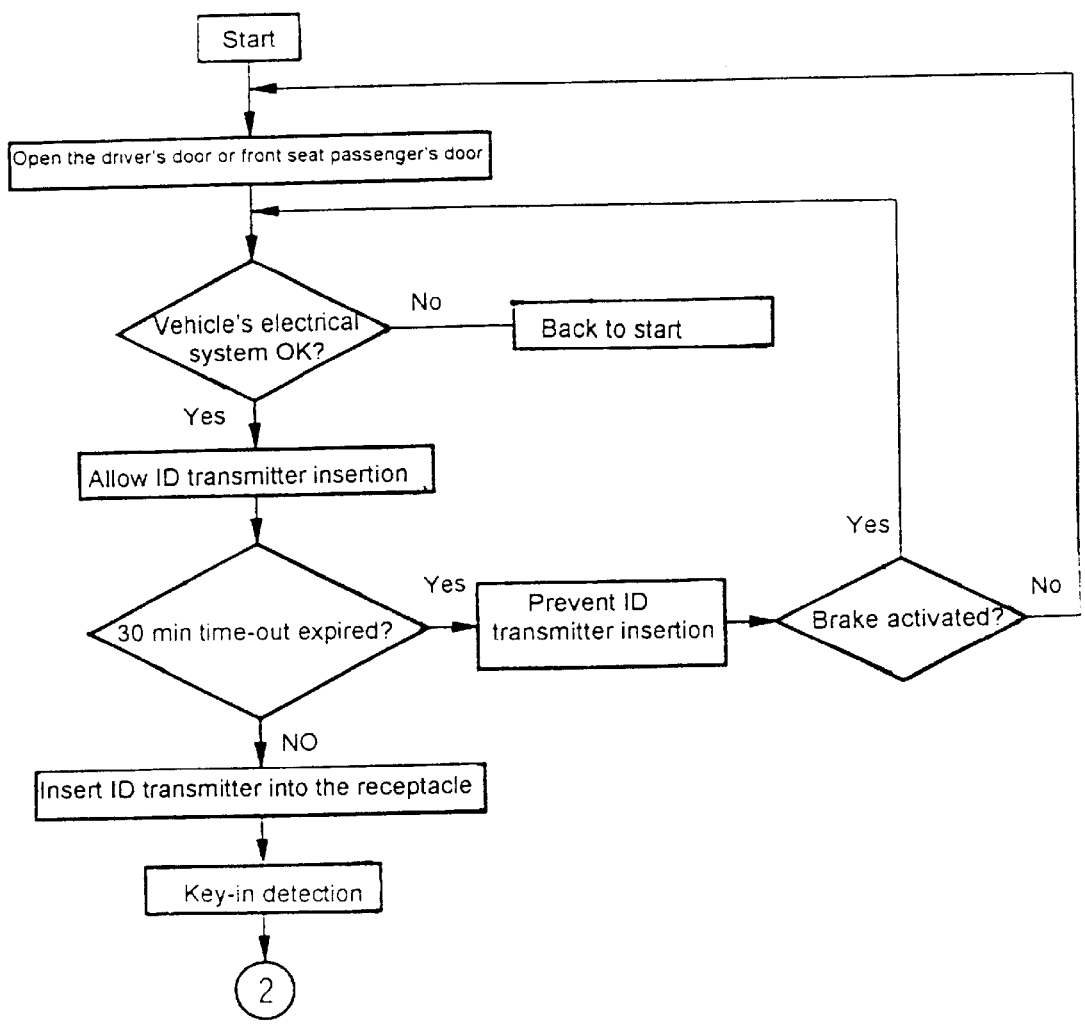
FIGS. 3A–3C show a flow chart relating to starting an internal combustion engine of a motor vehicle.
Figure 3B:
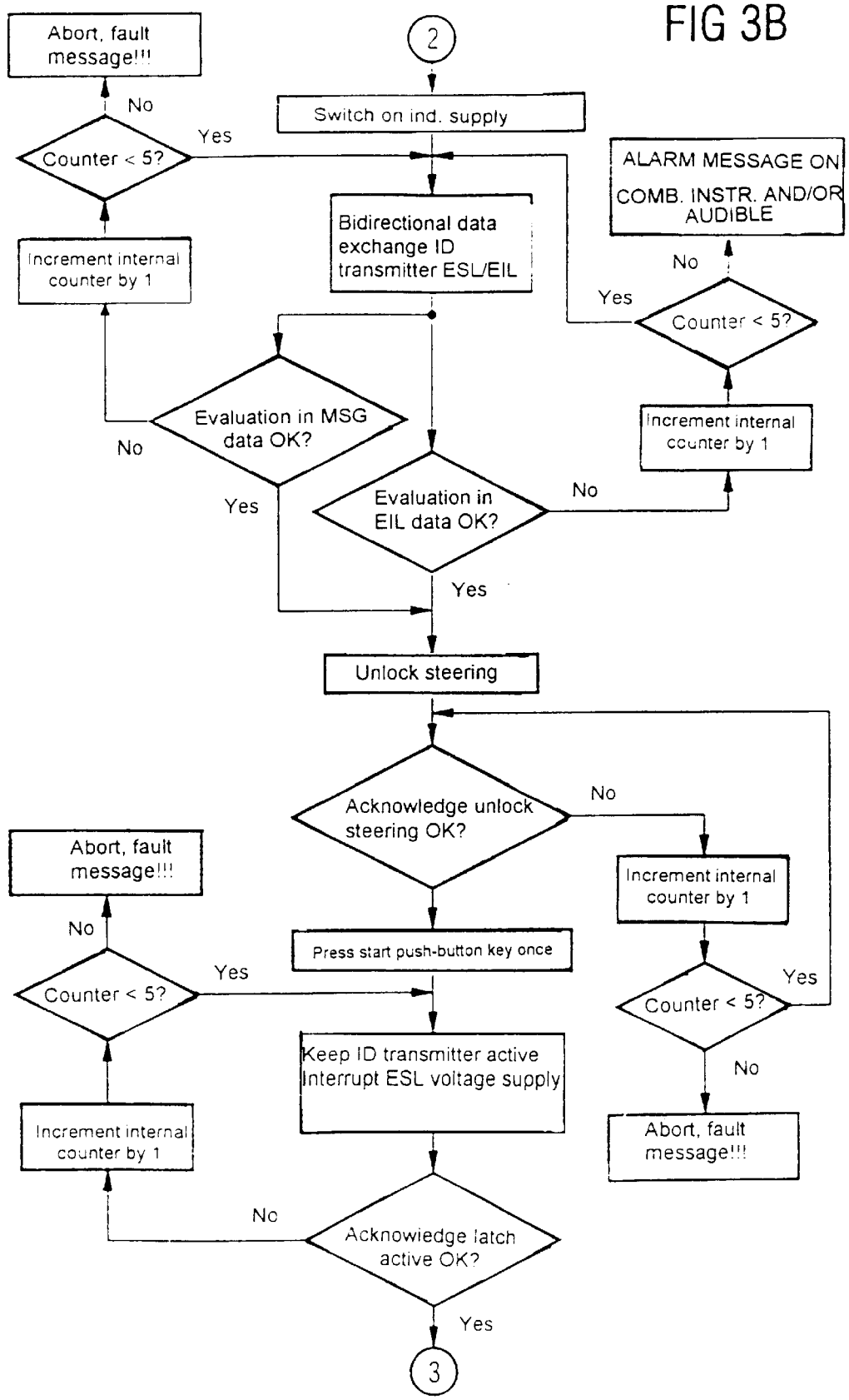
Figure 3C:
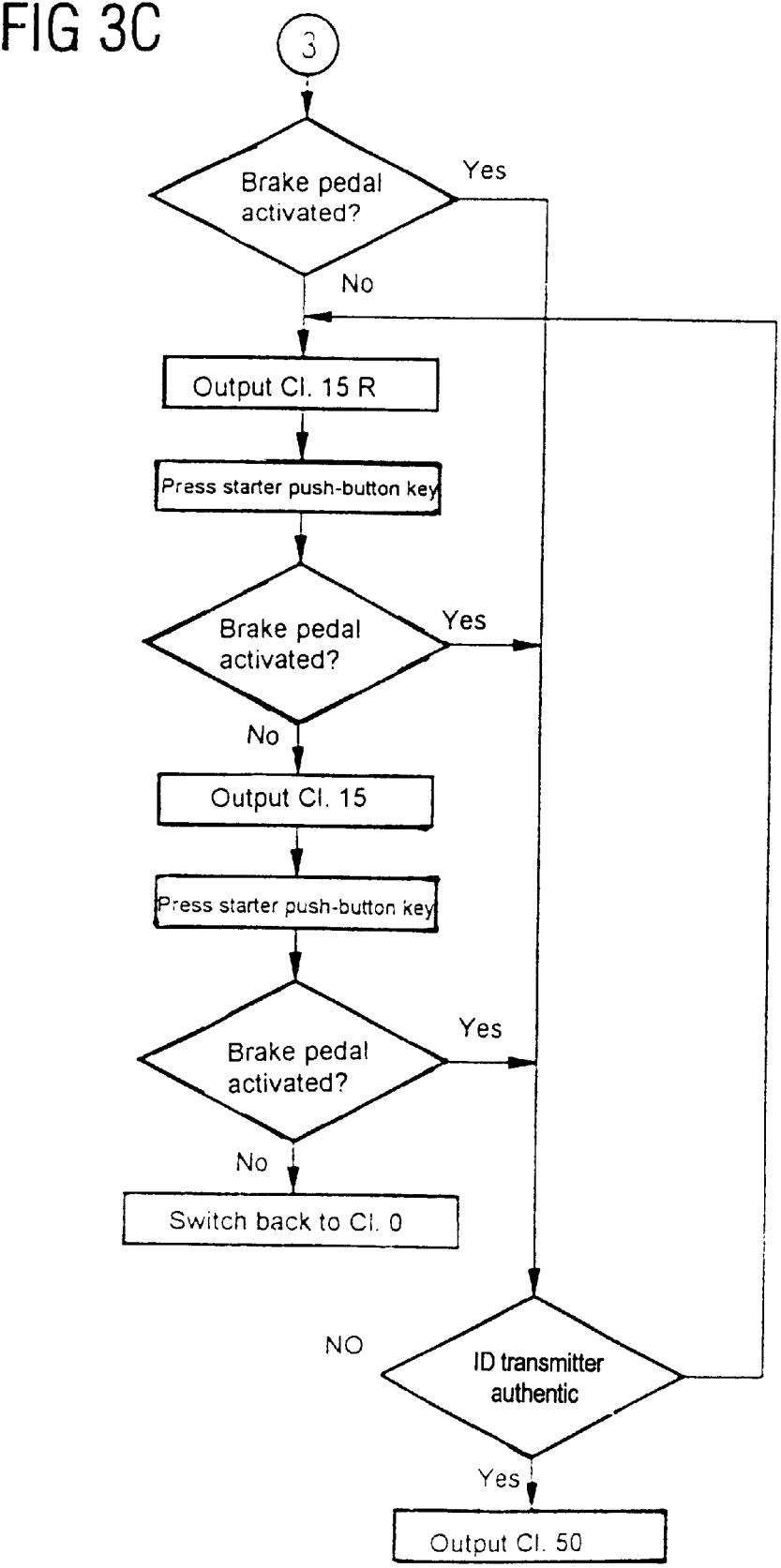

A method for starting a motor vehicle is explained in more detail with reference to a motor vehicle with an automatic transmission (FIG. 3). In the method, the electronic key 13 is inserted into the ignition-starter lock 10, but is not turned there. First, a precondition is that the driver must have unlocked the doors of his motor vehicle satisfactorily using a remote-control signal (code signal) that has been triggered manually by push-button keys 30 on the key 13.

After the driver's door or the front seat passenger's door has been opened, there is an interrogation to determine whether all the available voltages of the vehicle's electrical system are satisfactorily applied. If this is the case, the key latch 21 is released so that the key 13 (also referred to as ID signal transmitter) can be inserted into the key receptacle 11. If all of the voltages of the vehicle's electrical system are not present, the method is aborted. If appropriate a visual or audible warning may be emitted for the driver.

The key latch 21 may be released for 30 minutes, for example, to provide the driver with time to insert the key 13 into the key receptacle 11. After this time period (time-out), insertion of the key 13 is prevented unless the user activates other elements such as the brake pedal, for example.

If the key 13 is inserted into the key receptacle 11 within the waiting time, the inserted key 13 is detected by the first position sensor 17 (key-in detection). This can take the form of contact being made with a stop against which the key latch 21 bears when the key 13 is inserted. In this respect, this procedure corresponds to manual activation of an activation switch.

As soon as the key 13 is inserted (and this has also been detected), the control circuit instructs a power transmitter 31 to supply power to the electronic key 13 from the lock 10. A power transmitter 31, for inductively transmitting energy, in the form of a coil may be provided in the lock 10 (for example on the driver 20 or on the printed circuit board 23), and a power receiver in the form of a coil may be provided in the key 13.

As soon as the key 13 has sufficient energy, it transmits an encrypted authorization signal (code signal) back to the lock 10. The transmission of power from the lock 10 and the transmission of the code signal from the key 13 is referred to as bidirectional data exchange between the key 13 and the lock (ESL/EIL=electronic steering lock 40/electronic ignition-starter lock 10) or as a question/response dialog.

The code signal is then evaluated both by the control circuit for the steering lock 40 (ESL) and by the engine control unit (MSG). For this purpose, the code information that is contained in the code signal is decrypted and compared with reference code information that is stored in a storage device 46 (FIG. 1) as reference data. If the code signal does not prove to be authorized—even when repeated—permission to use the motor vehicle is refused and an alarm signal is generated.

If the code signal is authorized, i.e. if the data are satisfactory, the steering lock 40 is activated electromagnetically in order to enable the steering.

Whether or not the steering is actually enabled is checked. This can be effected by means of an inductive proximation sensor (not illustrated) which senses the position of the bolt 26. An acknowledgement signal is used to give an indication of whether or not the steering is actually unlocked, and this signal is provided to the control circuit on the printed circuit board 23. If the steering is not unlocked, the steering lock 40 can be activated again several times. If it is then still not unlocked, a fault message is output and the method is terminated.

If the steering has been correctly unlocked and a start push-button key (not illustrated) has been pressed at least once, first, a withdrawal lock is activated, preventing the key 13 from being withdrawn while in the inserted state. The key latch 21 engages the inserted key 13 for this purpose. Second, a current switch 32 is opened, as a result of which the power supply for the electromagnet 27, and thus for the steering lock 40, is switched off. In the deenergized state of the electromagnet 27, the bolt 26 does not engage in the steering column 29. The steering then reliably remains enabled.

If the key latch 21 is actually activated as a withdrawal lock, various electrical loads can subsequently be connected to the typical current terminals in a vehicle. The terminals have the designations C-115R, C-115, and C-150. Here, C-115R indicates the electrical connection to the ignition coil, C-115 indicates the connection to the positive pole of the battery, and C-150 indicates the connection to the starter. This means therefore that the ignition is switched on and the internal combustion engine 44 is started (immobilizer 42 is released).

It is then possible to connect through incrementally to the respective terminals C-115R, C-115 and C-150 if the brake pedal is respectively activated when there is an automatic transmission. Before the starter (C-150) is switched on, it is possible to check once more whether the code signal is also actually authorized (this is also referred to as authentication). If not, a fault message or an alarm can be generated.

If the internal combustion engine 44 is to be switched off (automatic stop procedure; see FIG. 4), the start key must first be pressed as an activation switch when the engine 44 is running. If the gear selector lever is in the position P (=parked), the withdrawal lock is deactivated so that the key 13 can be withdrawn from the key receptacle 11. At the same time, the current switch 32 is closed to connect the power supply to the steering lock 40 so that the steering can be locked. The electromagnet 27 is energized again, thus locking the steering, only when the speed of the vehicle is, for example, lower than 3 km/h. In this case, it is assumed that the driver wishes to deactivate the vehicle.

However, if the driving speed is still higher than the threshold value of 3 km/h, and the driver's door is already opened, a fault message is triggered. Opening of the doors can be detected by the door contact switches which are already present.

After the steering is locked by the bolt 26 engaging in the steering column 29, and the key 13 is withdrawn, the key latch 21 is activated again, with the result that the key 13 cannot be readily inserted into the key receptacle 11 of the lock.

If, instead of the insertable key 13, a chip card is used on which there is a transceiver unit (transponder), a separate ignition tip switch (corresponding to the starter push-button key) is used as a key latch 21. As long as the doors are not unlocked and opened, the ignition tip switch can be activated, but it does not activate any further functions. The bidirectional dialog (question/response dialog) between the key 13 and lock 10 can be carried out by transmitting energy to the key 13 and the latter transmitting its code signal as a result of the ignition tip switch being activated, only if the doors are unlocked and opened in an authorized way.

The method according to the invention includes the operation of an immobilizer 42 and of an electronic steering lock 40. The steering lock 40 is in any case inactive as long as the ignition of the vehicle is switched on. In this way, the steering cannot be blocked inadvertently while the vehicle is operating.

This method also prevents the key 13 from being inserted into the key receptacle 11 if the voltage supply of the motor vehicle is not sufficient. In this case, the key latch 21 is not activated. The key 13 cannot be withdrawn during driving either.

The position sensors 17, 22 can be activated mechanically or can operate in a contactless fashion (inductively, Hall sensors, ultrasonically, photoelectrically, electromagnetically, charge-coupled). The actual embodiment of the respective position sensor is not relevant to the invention. On the other hand, it is essential that a respective state or a position of an object is detected, and that in response to this a switching signal that can be evaluated is triggered.

The code signal is transmitted in a contactless fashion (optically, by radio or acoustically). Plus, there may be, for example, just one key-end coil and one lock-end coil that is then used as a power coil or transmitter 31 and a receiver 24. A power signal, possibly encrypted, is transmitted in one direction and the code signal is transmitted back in the opposite direction (this can also be referred to as a question/response dialog in which the answer is emitted only when the question is received). The key 13 can also have an IR transmitter and can have a coil as a power receiver.

The term "immobilizer" is to be understood to refer to all devices in the motor vehicle which can prevent the motor vehicle from being used. These devices are enabled only if an authentication has previously successfully taken place. An immobilizer 42 may include, for example, the engine control unit, a shut-off valve for the fuel supply, a switch for closing the connection to the battery, a transmission control unit, a switch for switching on the ignition circuit, a brake control unit, the steering system, etc.

The signals which are transmitted during the question/response dialog, such as the power signal and the code signal, are signals which each have a binary-encoded, encrypted information item (authorization data). The longer the information item, the safer the information against unauthorized decryption. As a result of the encryption, the code signal changes at each new encryption procedure. The code signal can be preceded or followed by a plurality of bits which are possibly required for a secure data transmission. The code information contained in the code signal is compared with the reference data. In the case of correspondence, an encoded enable or control signal is generated.

I claim:

1. A method of starting a motor vehicle, which comprises:
    providing a motor vehicle with an engine, an ignition-starter lock, a steering assembly, and an imobilizer;
    providing a key;
    manually activating a switch to transmit, in a contactless manner, encoded authorization data between the key and the ignition-starter lock;
    if the transmitted authorization data corresponds to reference data, activating-the steering lock to electromechanically enable the steering assembly;
    if the transmitted authorization data corresponds to reference data, releasing the imobilizer; and
    de-energizing the steering lock as long as the engine remains switched on.

2. The method according to claim 1, which comprises:
    providing the motor vehicle with a key receptacle and a position sensor;
    inserting the key into the key receptacle; and
    using the position sensor as an activation switch to detect whether the key is inserted into the key receptacle.

3. The method according to claim 1, which comprises:
    providing the motor vehicle with a withdrawal lock; and
    as long as the engine remains switched on, activating the withdrawal lock to prevent the key from being withdrawn from the key receptacle.

4. The method according to claim 1, which comprises:
    providing the motor vehicle with an electrical system; and
    only after all voltages of the electrical system are correctly applied, activating a key latch to permit the key to be inserted into a key receptacle.

5. The method according to claim 4, which comprises providing the motor vehicle with doors and releasing the key latch if the doors of the automobile are unlocked in an unauthorized manner.

6. The method according to claim 4, which comprises providing the motor vehicle with doors and releasing the key latch if the doors of the automobile are opened in an unauthorized manner.

7. The method according to claim 1, which comprises providing the engine as an internal combustion engine.

8. An ignition-starter device for use with a steering column, an ignition, and an engine of an automobile and with an electronic key, comprising:
    an activation switch for cooperating with an electronic key, said activation switch providing a signal when manually actuated by the electronic key, said signal causing the electronic key to transmit encoded authorization data in a contactless manner;

a receiver for receiving the encoded authorization data from the electronic key;

a storage device for storing reference data;

a steering lock for electromechanically locking and unlocking a steering column of an automobile, said steering lock unlocking the steering column if the authorization data received by said receiver correspond with the reference data stored in said storage device;

an imobilizer for imobilizing an engine of an automobile, said imobilizer being released so that the engine can be started if the authorization data received by said receiver correspond with the reference data stored in said storage device; and a current switch for supplying power to said steering lock, said current switch disconnecting power from said steering resulting in enablement of the steering column of the automobile.

* * * * *